Figure 1:
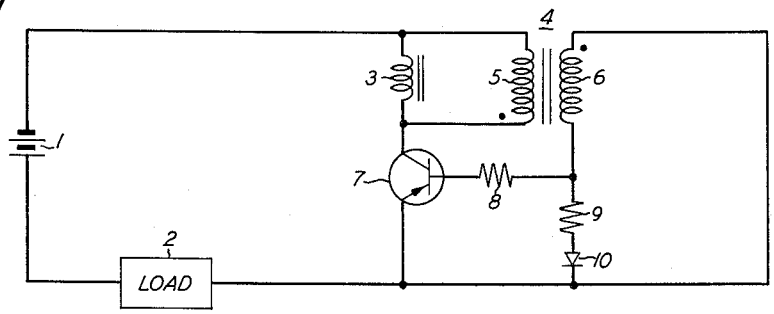

Jan. 11, 1966   J. K. MILLS   3,229,194
SWITCHING REGULATOR
Filed Sept. 29, 1961   2 Sheets-Sheet 1

INVENTOR
J. K. MILLS
BY
George C. Lord
ATTORNEY

Jan. 11, 1966  J. K. MILLS  3,229,194
SWITCHING REGULATOR
Filed Sept. 29, 1961  2 Sheets-Sheet 2

INVENTOR
J. K. MILLS
BY
George C. Ford
ATTORNEY

# United States Patent Office 3,229,194
Patented Jan. 11, 1966

3,229,194
SWITCHING REGULATOR
John K. Mills, Morristown, N.J., assignor to Bell Telephone Laboratories, Incorporated, New York, N.Y., a corporation of New York
Filed Sept. 29, 1961, Ser. No. 141,797
9 Claims. (Cl. 323—22)

This invention relates to power supply systems and more particularly to a high efficiency system for controlling the current flow from a source of potential to a load.

The voltage and current regulators of the prior art are numerous. Usually an output voltage controlled impedance element operated in the active region (i.e., between the cut-off and saturation regions without going into either) is serially connected between the source of potential and the load. The impedance of, hence the voltage drop across, the impedance element varies in accordance with load voltage variations to maintain a constant voltage across the load. The impedance element may be thought of as a variable resistor which absorbs the difference between the source and load potentials. Accordingly, this regulating element dissipates large amounts of power and requires means to remove the heat inherently generated. The efficiencies of such regulators are, even under optimum conditions, limited to the 70 percentile region.

One object of this invention is, therefore, to increase the efficiency with which voltages and currents may be regulated.

A closely related object is to do so as simply, reliably and inexpensively as possible without restricting the applicability of the regulator.

The present invention employs a transistor "chopper" in series with the input source of potential and the load. The "chopper" comprises a feedback controlled blocking oscillator transistor as the series regulating element. Since the regulating element is driven rapidly from cut-off to saturation and is operated for only a portion of the cycle in saturation, the power losses (voltage drop and heat) due to the internal impedance of the regulating element are reduced to a negligible value. Completely lossless regulators are, therefore, theoretically possible. It should be noted, however, that although a transistor has negligible internal impedance when operated in saturation and hence negligible power loss, the efficiency of such a regulator is limited, from a practical standpoint, to the 90 percentile region by the other circuit parameters.

In addition to being a highly efficient voltage and current regulator, the present invention also possesses a high degree of power supply application flexibility. The simplicity and component economy of the invention makes power supply applications such as voltage dividers, regulator-rectifiers, counter E.M.F. cells, pulse generators, interrupter-to-pulse ferreed switches or relays, etc., both feasible and desirable. Each of these species is concerned with controlling either the "open" or "closed" periods, or both, of the "chopping" element in accordance with output current and voltage variations. The exact embodiment employed would depend upon the desired usage.

Figure 2:
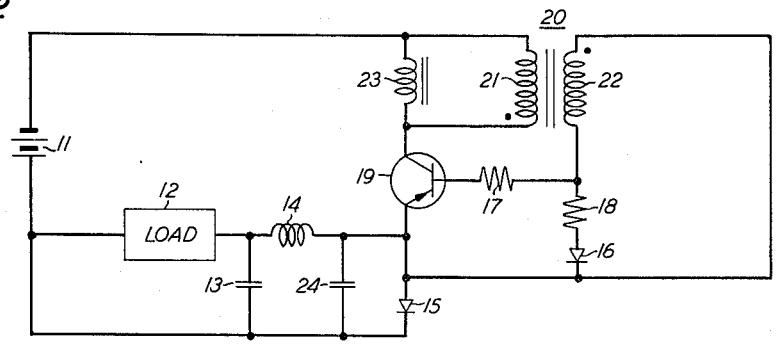
Figure 3:
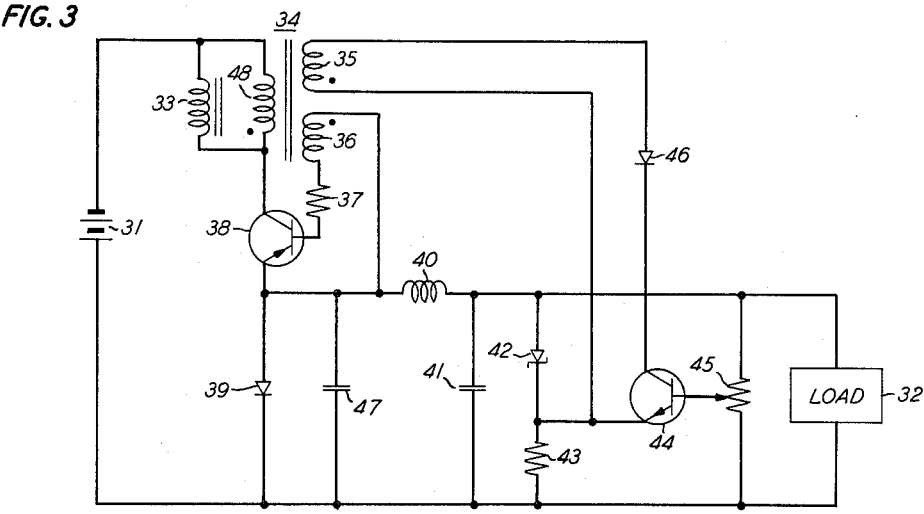
Figure 4:
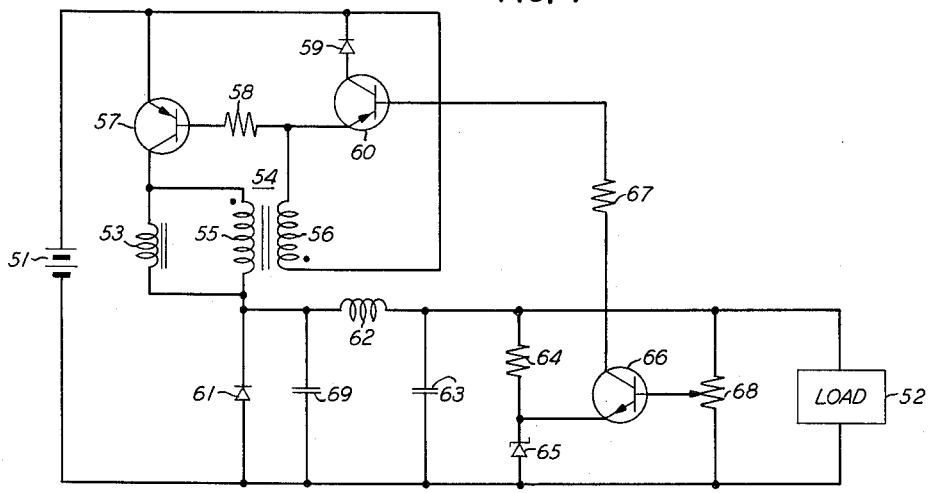
Figure 5:
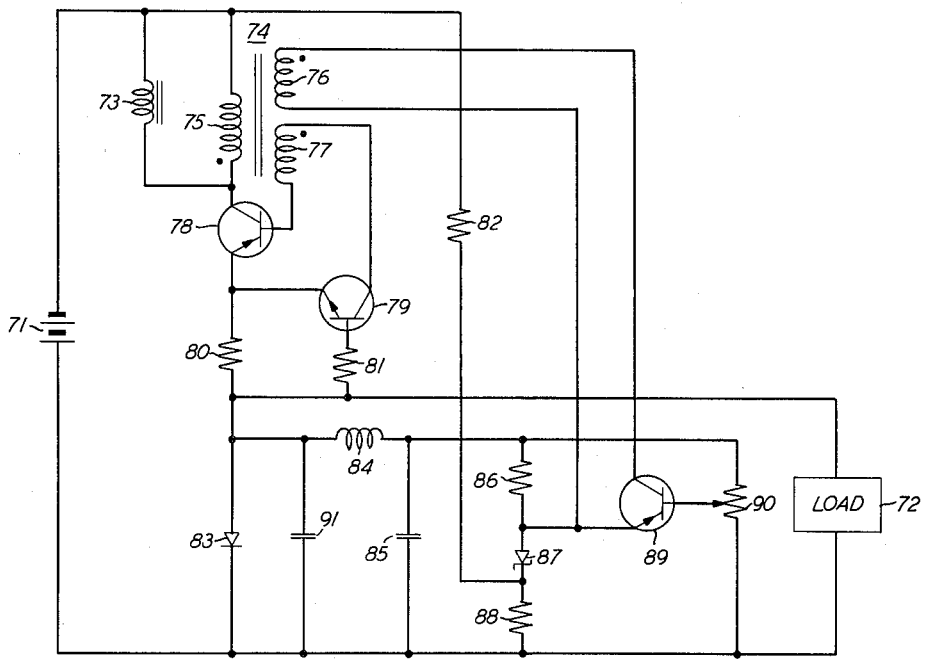

Other objects and features of the present invention will become apparent upon consideration of the following detailed description when taken in connection with the accompanying drawings in which:

FIG. 1 is a schematic representation of a simple embodiment of the invention;

FIG. 2 of which represents another modified embodiment of the invention;

FIGS. 3, 4, and 5 of which represent embodiments of the invention in which output voltage control is employed.

As can be seen from FIG. 1 of the drawing there is provided a source of direct-current potential 1, a load 2, an inductor 3, a current transformer 4 with windings 5 and 6, a pnp transistor 7, resistors 8 and 9 and an asymmetrically conducting device 10.

The direct-current source 1 is serially connected with the load 2, the emitter and collector electrodes of transistor 7 and transformer winding 5. Inductor 3 is connected across transformer winding 5. Transformer winding 6 is serially connected with resistor 9 and asymmetrically conducting device 10. Resistor 8 connects the base electrode of transistor 7 to the juncture of transformer winding 6 and resistor 9.

Since the dot convention will be referred to frequently in the following discussion it shall be defined at this time. Briefly, the dot convention refers to a means whereby the polarity of a voltage induced in a winding can be ascertained at any instant in the cycle of operation. For purposes of this description whenever a dot appears in relation to a winding, the polarity of the voltage induced at the dot in that winding has the same polarity as the voltage induced at the dot of every winding in the same magnetic field.

Once the input direct-current potential source 1 is applied to the circuit, a small amount of current will flow through the load 2 through the emitter-collector path of transistor 7 through the transformer winding 5 and back to the direct-current source 1. As can be seen from the dot convention, the current flow through winding 5 is such as to induce a voltage in winding 6 such as to drive transistor 7 further into conduction. In a preferred embodiment the turns ratio of winding 5 to winding 6 would be such as to drive transistor 7 immediately into saturation. It should be noted that at this point in time the current flowing through the load 2 is essentially the voltage of the supply source 1 divided by the impedance of the load 2 since the potential drops across the saturated transistor collector-emitter electrodes and the transformer winding 5 are negligible. Inasmuch as the impedance of the inductor 3 is many times greater than the virtual impedance of transformer winding 5, initially almost all the current flows through winding 5. This is due to the fact that to a first approximation the winding 5 appears to the circuit as a resistor whose resistance comprises the impedance of the circuit of winding 6 as modified by the square turns ratio. As time goes on, however, the current in the inductor 3 increases toward a point where it would carry all of the current flowing through the load 2. This period of time required to reach this point would be approximately $5L/R$, where R is the total circuit resistance and L is the inductance of the inductor 3, were it not for the fact that the parameters of the circuit prevent this point from being reached. When the magnitude of the current flowing through the winding 5 falls to a point such as to drive transistor 7 out of the saturation region and into the active region, the impedance of, hence the voltage drop across, the emitter-collector path of the regulating transistor 7 now increases and, in turn, decreases the total current flowing in the series loop comprising the direct-current source of potential 1, the collector-emitter path of transistor 7 and the parallel combination of the coil 3 and the transformer winding 5. The inductor 3, however, opposes any sudden current change in the circuit. When the current through the inductor 3 starts to decrease, the flux surrounding the inductor collapses and induces an E.M.F. in the opposite direction which, in turn, causes a current to flow through the transformer winding 5 in the opposite direction to the load current. As seen from the dot convention, the current flowing through resistor 9 and asymmetrically conducting device 10 is now such as to bias transistor 7 into cut-off.

This condition exists until the energy in the inductor 3 is dissipated. This, in turn, depends upon the reflected impedance of the circuit of winding 6. It should be apparent that the "off" time of transistor 7 may be controlled by varying the impedance of the elements which comprise the circuit of winding 6. When the energy in the inductor is dissipated, a new cycle of operation is started in the manner described heretofore. It should be noted that since the transistor is not in saturation when biased toward cut-off, the storage time required with other types of circuits for consumption of the excess minority carriers is not necessary. As a result, the transistor switches more rapidly.

Although inductor 3 has so far been assumed to be connected in parallel with the transformer winding 5, if the current transformer 4 is in fact ideal, or nearly so, it is apparent that the inductor can instead be connected across transformer winding 6 or to a tertiary winding with the same results provided that its inductancy is suitably adjusted in accordance with the square-turns ratio of the windings.

Somewhat less obviously, the inductor may be omitted entirely as a separate and visible component and replaced by an equivalent shunt inductance in the transformer 4, obtained by providing an air gap in the core or by other means. Circuit operation is not affected by this change. Since the operation of the circuit can more readily be visualized, however, a separate inductor is shown throughout this specification. For economy the inductor function would usually be built into the transformer in a production design.

The elements 11, 12, 23, 20, 21, 22, 19, 17, 18 and 16 of FIG. 2 corresponds to the elements 1 through 10 of FIG. 1, respectively. Capacitor 13 of FIG. 2 is connected across the load 12 and inductor 14 is connected in series with the direct-current source 11, the load 12, the collector-emitter electrodes of transistor 19 and the winding 21. Capacitor 13 and inductor 14 form a low pass filter which isolates the load 12 and filters the current pulses so that their average value is delivered to the load. Asymmetrically conducting device 15 which is connected across the filter inductor 14 and the load 12 provides a discharge path for the energy stored in inductor 14 when transistor 19 is biased "off." A capacitor 24 is added in parallel with the asymmetrically conducting device 15 to speed up the "turn-on" of transistor 19. Since further details of the opertion of the circuit of FIG. 2 are essentially the same as the details of the operation of FIG. 1, they are not discussed further at this time.

The elements 31, 32, 41, 40, 47, 39, 37, 34, 48, 36, 33 and 38 of FIG. 3 correspond to the elements 11, 12, 13, 14, 24, 15, 17, 20, 21, 22, 23, and 19 of FIG. 2, respectively. In FIG. 3 a tertiary winding 35 on transformer 34 is serially connected to the emitter-collector electrodes of error detector transistor 44 and blocking asymmetrically conducting device 46. Two parallel paths are connected across the load 32. The first comprises Zener asymmetrically conducting device 42 and resistor 43 while the second comprises potentiometer 45. The emitter electrode of transistor 44 is connected to the juncture of asymmetrically conducting device 42 and resistor 43 while the base electrode of transistor 44 is connected to the tap of potentiometer 45. The operation of the circuit of FIG. 3 is essentially the same as the operation of the circuit of FIG. 2 with the exception that the additional elements 42, 43, 44, 45, 46 and 35 provide control of the off time of transistor 38 in accordance with the load voltage variations in the following manner: Assuming that transistor 38 has just been biased into cut-off in the manner discussed in connection with FIG. 1, it is apparent that the length of time the transistor 38 is in cut-off depends upon the rate of dissipation of the flux in the core of inductor 33. As seen with the aid of the dot convention, asymmetrically conducting device 46 is poled such as to render the circuit of the tertiary winding 35 "open" when transistor 38 is conducting. When transistor 38 is biased into cut-off this asymmetrically conducting device is poled in the forward conduction direction. If the potential across the load 32 should rise, a proportional portion of the potential rise will appear across each segment of potentiometer 45. Since the Zener asymmetrically conducting device 42 is contiuously "broken-down," i.e., conducting in the reverse direction, the voltage across it remains constant, and all the potential rise appearing across the load 32 appears across resistor 43. The potential across the base-emitter paths of transistor 44 thus decreases causing less base-emitter and, in turn, collector-emitter current flow. Since there is less collector-emitter current flow in transistor 44, the length of time it takes the flux in the core of inductor 33 to dissipate increases, resulting in a longer "off" time for transistor 38 thus compensating for the original rise of potential across the load.

It should be noted that if extra amplification were required, an additional transistor could be inserted in the "off" time control circuit in a manner frequently taught by the prior art.

The elements 51, 52, 53, 55, 54, 61, 58, 59, 69, 62, 63, 65, 64, 66, and 68 of FIG. 4 correspond to elements 31, 32, 33, 48, 34, 39, 37, 46, 47, 40, 41, 42, 43, 44 and 45 of FIG. 3, respectively. Transistor 60 of FIG. 4 replaces tertiary windings 35 of FIG. 3. As can be seen with the aid of the dot convention, asymmetrically conducting device 59 is back-biased while transistor 57 is conducting and is forward biased to provide a path through the emitter-collector electrodes of transistor 60 to dissipate the energy in the core of inductor 53 when transistor 57 is biased "off." The operation of this "off" time circuit can best be understood by assuming the potential across the load 52 rises. Since the potential across the Zener asymmetrically conducting device 65 is constant, the voltage appearing across the base-emitted electrodes of transistor 66 rises in proportion to the setting of potentiometer 68. This causes the more base-emitter hence collector-emitter current flow in traisistor 66 which, in turn, increases the base-emitter and emitter-collector current flow through transistor 60. The length of time it takes the flux in the core of inductor 53 to dissipate depends inversely upon the voltage across it. Increased collector-emitter current flow in transistor 60 thus increases the rate of flux dissipation across inductor 53 which, in turn, increases the "off" time of transistor 57 which compensates for the original increase in load potential.

The elements 71, 78, 83, 73, 75, 74, 77, 84, 91, 85, 86, 87, 89, 90, and 72 of FIG. 5 correspond to the elements 51, 57, 61, 53, 55, 54, 56, 62, 69, 63, 64, 65, 66, 68, and 52, of FIG. 4, respectively. The "off" periods of the circuits of FIGS. 1–4 are sensitive to temperature, magnitude of the load, and other effects. Where the load is constant, however, the error detector can be isolated from the load to obtain fixed "off" periods as shown in FIG. 5. With such an arrangement, if the load is variable while the supply is constant then, although the "on" and "off" periods will be no longer fixed, the ratio of the periods will still be regulated. The circuit may be further modified to compensate for variations in input voltage by adding a fraction of the input potential to the error signal. The voltage divider network comprising resistors 82 and 88 in FIG. 5 is added to the configuration for such a purpose. Such a feature is usually referred to as line compounding. It is easily seen that line compounding can also be added to the structures of FIGS. 3 and 4 to minimize source voltage variations. The tertiary winding of the circuit of FIG. 5 is the same as the tertiary winding circuit discussed in connection with FIG. 4. An additional resistor 80 is inserted in series with the source of direct-current potential 71, the load 72, the emitter-collector path of transistor 78, and the winding 75 to provide load voltage variation bias to the base-emitter electrodes of additional transistor 79. The base-emitter electrodes of transistor 79 are serially connected across resistor 80 by base-current limiting resistor 81. The collector-emitter electrodes of transistor 78 are serially connected to the emitter-base electrodes of regulating transistor 78 and winding 77. Since the biasing resistor 80 is in series with the load 72, load variations will be reflected in the voltage drop across this resistor and effect the base-emitter, hence the collector-emitter current flow through transistor 79. This, in turn, limits the current flow through the emitter-base path of transistor 78 and winding 77 thus controlling the transistor "on" time. It should be noted that the circuits of FIGS. 1 to 4 also control both the transistor "on" and "off" time.

It should be understood that with the appropriate modifications taught by the prior art, either npn or pnp transistors or any equivalent element such as a pnpn switch, mechanical switch, etc. may be used equally as effectively in each of the embodiments of FIGS. 1 to 5.

Since changes may be made in the above-described arrangement and different embodiments may be devised by those skilled in the art without departing from the spirit and scope of the invention, it is to be understood that all matter contained in the foregoing description and accompanying drawings is illustrative of the application of the principles of the invention and is not to be construed in a limiting sense.

What is claimed is:

1. A high efficiency voltage regulator comprising a source of potential, a load, a regulating element having both conductive and nonconductive states, and a regenerative feedback network including a control element connected to said regulating element to render said regulating element conductive for a relatively constant interval and nonconductive for a variable interval controlled by said control element, means serially connecting said source, said regenerative feedback network, said regulating element, and said load to intermittently transfer the voltage of said source directly to said load without substantial change, and means responsive to load voltage variations connected to said control element to vary the duration of the nonconductive interval, with respect to the constant conductive interval, of said regulating element.

2. A high efficiency regulator comprising a source of potential, a load, a regulating transistor, and regenerative feedback network including a control transistor connected to said regulating element to switch the emitter-collector path of said regulating transistor into conduction for a relatively constant interval and into cutoff for an interval determined by the emitter-collector impedance of said control transistor, means serially connecting said source, said regenerative feedback network, the emitter-collector path of said regulating transistor, and said load to intermittently supply the voltage of said source to said load without substantial loss, and means responsive to load voltage variations connected to bias said control transistor to vary the duration of the nonconductive interval, with respect to the constant conductive interval, of said regulating element.

3. A regulator circuit comprising first and second transistors each having base, collector and emitter electrodes, a transformer having first, second, and third windings, a source of direct-current potential, a load, means for serially connecting said source of potential, said load, the emitter-collector electrodes of said first transistor, and said first winding, means for connecting said second winding across the base-emitter electrodes of said first transistor, an asymmetrically conducting device, a constant reference potential, means for obtaining at least a portion of the potential appearing across said load, means for applying the difference between said constant potential and the proportional potential appearing across said load to the base and emitter electrodes of said second transistor, and means for serially connecting said asymmetrically conducting device, the collector-emitter electrodes of said second transistor and said third winding.

4. A regulator circuit comprising first and second transistors each having base, collector and emitter electrodes, a transformer having first, second and third windings, a source of direct-current potential, a load, a filter inductor, means for serially connecting said source of potential, said load, said filter inductor, the emitter-collector electrodes of said first transistor and said first winding, means for connecting said second winding across the base-emitter electrodes of said first transistor, inductance means, means for effectively connecting said inductance means across said first winding, first and second asymmetrically conducting devices, means for serially connecting said first asymmetrically conducting device, said filter inductor and said load, first and second capacitors, means for connecting said first capacitor across said first asymmetrically conducting device, means for connecting said second capacitor across said load, a constant reference potential, means for obtaining at least a portion of the potential appearing across said load, means for applying the difference between said constant potential and said proportional potential to the base and emitter electrodes of said second transistor and means for serially connecting said second asymmetrically conducting device, the collector-emitter electrodes of said second transistor, and said third winding.

5. A regulator circuit comprising first, second, and third transistors each having first, second and control electrodes, a transformer having first and second windings, a source of potential, a load, means for serially connecting said source of potential, said load, said first winding and the first and second electrodes of said first transistor, means for connecting the control electrode of said first transistor to the second electrode of said second transistor, means for connecting said second winding across the control and second electrodes of said first transistor, an asymmetrically conducting device, means for connecting the first electrode of said second transistor to the second electrode of said first transistor, said means comprising said asymmetrically conducting device, a constant reference potential, means for obtaining a portion of the voltage appearing across said load, means for applying the difference between said reference and load portion voltage to the second and control electrodes of said third transistor, and means for connecting the first electrode of said third transistor to the control electrode of said second transistor thereby controlling the nonconduction period of said first transistor in accordance with load voltage variations.

6. A regulator circuit in accordance with claim 5 wherein an inductance means is effectively connected across said first winding to control the conduction period of said first transistor.

7. A regulator circuit comprising first, second and third transistors each having base, collector and emitter electrodes, a transformer having first and second windings, a source of potential, a load, a filter inductor, means for serially connecting said source of potential, said load, said filter inductor, said first winding and the collector-emitter electrodes of said first transistor, inductance means, means for effectively connecting said inductance means across said first winding, first and second asymmetrically conducting devices, first and second resistors, means for serially connecting the base electrode of said first transistor, said first resistor, the emitter-collector electrodes of said second transistor, said first asymmetrically conducting device, and the emitter electrode of said first transistor, means for connecting the emitter electrode of said second transistor to the emitter electrode of said first transistor, said means comprising said second winding, means for serially connecting said second asymmetrically conducting device, said filter inductor and said load, first and second capacitors, means for connecting said first capacitor across said first asymmetrically conducting device, means for connecting said second capacitor across said load, a constant reference potential, means for obtaining a portion of the voltage appearing across said load, means for applying the difference between said reference potential and said portion of the load potential to the base-emitter electrodes of said third transistor, and means for connecting the collector electrode of said third transistor to the base electrode of said second transistor, said means comprising said second resistor.

8. A regulator circuit comprising a source of potential, a load, a regulating transistor having its emitter-collector path conductively connected in series between said source and said load to intermittently supply a voltage the magnitude of which is no greater than that of said source to said load, a transformer having first, second and third windings, said first and second windings being connected to said regulating transistor to provide regenerative feedback thereto, and a control transistor connected to said third winding, the emitter-collector impedance of said control transistor being responsive to load voltage variations to vary the duration of the interval said voltage is interrupted with respect to the interval said voltage is supplied.

9. A regulator circuit comprising a source of potential, a load, a regulating device having conducting and substantially nonconducting states and input, output, and control electrodes, a transformer having first, second and third windings, means serially connecting said source, said load, the input and output electrodes of said regulating device and said first transformer winding to provide a current path from said source to said load, a first control network connecting said input and control electrodes to said second winding to control the duration of the conducting state of said regulating device, a second control network connected to said third winding to vary the duration of the substantially nonconducting state with respect to the duration of the conducting state of said regulating device in accordance with load voltage variations, and energy storage means connected across said load to speed up the termination of the substantially nonconducting state and the initiation of the conducting state of said regulating device, whereby high switching frequencies of said regulating device are made possible.

References Cited by the Examiner
UNITED STATES PATENTS

| | | | |
|---|---|---|---|
| 2,772,370 | 11/1956 | Bruce et al. | 323—22 |
| 2,776,382 | 1/1957 | Jensen | 307—97 |
| 2,848,614 | 8/1958 | Lyons | 323—22 |
| 3,093,790 | 6/1963 | Ehret | 323—22 |

FOREIGN PATENTS

| | | |
|---|---|---|
| 1,214,291 | 4/1960 | France. |

LLOYD McCOLLUM, *Primary Examiner.*